US012811971B2

(12) United States Patent
Zink et al.

(10) Patent No.: US 12,811,971 B2
(45) **Date of Patent: *Nov. 24, 2026**

(54) POLYMORPHIC NON-ATTRIBUTABLE WEBSITE MONITOR

(71) Applicant: Bank of America Corporation, Charlotte, NC (US)

(72) Inventors: Robert Zink, Golden, CO (US); Eric DePree, Evanston, IL (US); Stephanie Pirman, Chicago, IL (US); Jared Wilson, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 47 days.

This patent is subject to a terminal disclaimer.

(21) Appl. No.: 19/043,896

(22) Filed: Feb. 3, 2025

(65) Prior Publication Data

US 2025/0184342 A1 Jun. 5, 2025

Related U.S. Application Data

(63) Continuation of application No. 18/106,041, filed on Feb. 6, 2023, now Pat. No. 12,255,908.

(51) Int. Cl.
*H04L 9/40* (2022.01)

(52) U.S. Cl.
CPC ...... *H04L 63/1425* (2013.01); *H04L 63/1416* (2013.01); *H04L 63/1483* (2013.01)

(58) Field of Classification Search
CPC ............. H04L 63/1416; H04L 63/1425; H04L 63/0407; H04L 63/0823; H04L 63/1483
See application file for complete search history.

(56) References Cited

U.S. PATENT DOCUMENTS

| | | | |
|---|---|---|---|
| 9,424,424 | B2 | 8/2016 | Klein |
| 9,614,869 | B2 | 4/2017 | Prieto Alvarez et al. |
| 10,033,746 | B2 | 7/2018 | Niemela et al. |

(Continued)

FOREIGN PATENT DOCUMENTS

| | | | |
|---|---|---|---|
| BR | 112014021578 A2 | 5/2021 | |
| KR | 101562109 B1 | 10/2015 | |

(Continued)

*Primary Examiner* — Frantz B Jean

(74) *Attorney, Agent, or Firm* — Banner & Witcoff, Ltd.

(57) ABSTRACT

Polymorphic non-attributable processes and architectures to monitor threat domains (e.g., pharming or phishing websites) are disclosed. Obfuscated requests may be generated by control servers to be blended in with normal traffic sent over cloud networks with randomized exit nodes or with normal traffic sent through an anonymization network. Requests may be sent at randomized intervals or time periods determined algorithmically. The requests are obfuscated in order to mask the origination information and location so that the threat actor does not detect that the website is being monitored. User agents may be spoofed and requests may present as if they originated from residential IP addresses. Automatic real-time monitoring can be provided to determine when sites resolve and are addressable. Fingerprint information, screenshots, security certificate, and other threat domain data can be captured. Request responses can be scanned for threat indicia.

20 Claims, 4 Drawing Sheets

(56) References Cited

U.S. PATENT DOCUMENTS

| | | | | |
|---|---|---|---|---|
| 10,817,957 | B2 | 10/2020 | Celikyilmaz et al. | |
| 10,862,907 | B1 * | 12/2020 | Pon | G06F 16/955 |
| 11,334,190 | B2 | 5/2022 | Rosenberg et al. | |
| 11,949,693 | B2 * | 4/2024 | Thomson | H04L 63/0236 |
| 2015/0067853 | A1 | 3/2015 | Amrutkar et al. | |
| 2018/0041537 | A1 * | 2/2018 | Bloxham | H04L 63/0263 |
| 2018/0063190 | A1 | 3/2018 | Wright et al. | |
| 2020/0137110 | A1 * | 4/2020 | Tyler | H04L 63/145 |
| 2022/0319260 | A1 | 10/2022 | Carter | |
| 2024/0146693 | A1 * | 5/2024 | Sadagopan | H04L 63/0263 |
| 2024/0171596 | A1 * | 5/2024 | Jeyakumar | H04L 63/1416 |
| 2024/0314169 | A1 * | 9/2024 | Azad | H04L 63/1416 |
| 2024/0414198 | A1 * | 12/2024 | Weber | H04L 51/212 |

FOREIGN PATENT DOCUMENTS

| | | | |
|---|---|---|---|
| KR | 101904486 | B1 | 10/2018 |
| WO | 2019220986 | A1 | 11/2019 |

* cited by examiner

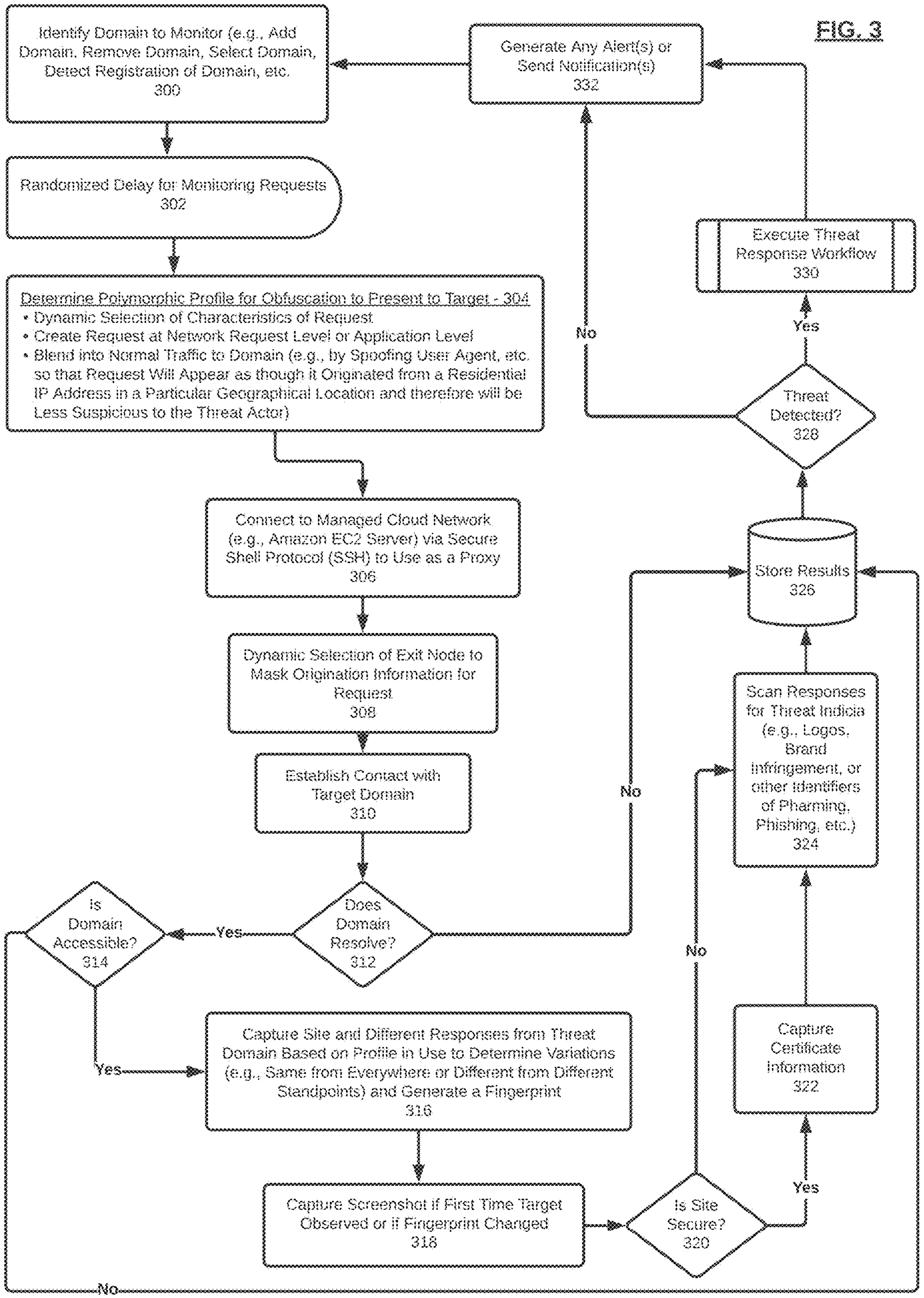
FIG. 3
Identify Domain to Monitor (e.g., Add Domain, Remove Domain, Select Domain, Detect Registration of Domain, etc.
300
Randomized Delay for Monitoring Requests
302
Determine Polymorphic Profile for Obfuscation to Present to Target - 304
• Dynamic Selection of Characteristics of Request
• Create Request at Network Request Level or Application Level
• Blend into Normal Traffic to Domain (e.g., by Spoofing User Agent, etc. so that Request Will Appear as though it Originated from a Residential IP Address in a Particular Geographical Location and therefore will be Less Suspicious to the Threat Actor)
Connect to Managed Cloud Network (e.g., Amazon EC2 Server) via Secure Shell Protocol (SSH) to Use as a Proxy
306
Dynamic Selection of Exit Node to Mask Origination Information for Request
308
Establish Contact with Target Domain
310
Does Domain Resolve?
312
Yes
No
Is Domain Accessible?
314
Yes
No
Capture Site and Different Responses from Threat Domain Based on Profile in Use to Determine Variations (e.g., Same from Everywhere or Different from Different Standpoints) and Generate a Fingerprint
316
Capture Screenshot if First Time Target Observed or if Fingerprint Changed
318
Is Site Secure?
320
Yes
No
Capture Certificate Information
322
Scan Responses for Threat Indicia (e.g., Logos, Brand Infringement, or other Identifiers of Pharming, Phishing, etc.)
324
Store Results
326
Threat Detected?
328
Yes
No
Execute Threat Response Workflow
330
Generate Any Alert(s) or Send Notification(s)
332

POLYMORPHIC NON-ATTRIBUTABLE WEBSITE MONITOR

CROSS REFERENCE TO RELATED APPLICATION

This application claims priority to and is a Continuation of U.S. Ser. No. 18/106,041, filed on Feb. 6, 2023, and titled "Polymorphic Non-Attributable Website Monitor" The related application is incorporated by reference herein in its entirety for all purposes.

TECHNICAL FIELD

The present disclosure relates to information security and, more particularly, to systems, methods, and apparatus for prevention of unauthorized use of data including prevention and detection of piracy, fraudulent websites, malicious traffic service, phishing, pharming, web spoofing, and intellectual property infringement.

DESCRIPTION OF THE RELATED ART

An online fraud known as "pharming," which is a combination of the words "phishing" and "farming," is similar to "phishing" in that it involves the manipulation of website traffic in order to steal confidential information. The creation of a bogus website followed by the unlawful redirection of traffic to that website is referred to as "cybersquatting."

Pharming is an attack that takes advantage of the fundamental workings of internet browsing, namely the requirement that the series of letters that make up an internet address must be transformed into an IP address by a DNS server before the connection can be made.

One of two strategies can be used to disrupt this process using pharming. First, a hacker may send harmful code in an email to a victim, which then causes the recipient's machine to become infected with a virus or Trojan horse. This malicious code modifies the hosts file on the computer to redirect traffic away from the website that was supposed to be the target of the attack and toward a phony website instead. Even if you punch in the proper internet address, you will still be redirected to the fake site since the hosts file has been tampered with and is now corrupted. This method of pharming is known as malware-based pharming. The second possibility is that the hacker will utilize a method known as DNS poisoning. DNS is an acronym that stands for "Domain Name System." Phishers have the ability to manipulate the DNS table that is stored on a server, which leads several users to mistakenly visit bogus websites rather than authentic ones. Phishers can use bogus websites to infect the user's computer with viruses or Trojan horses, or they can try to obtain the user's personal and financial information in order to steal their identities.

Although DNS servers are more difficult to breach since they are located on an organization's network and protected by its defenses, DNS poisoning has the potential to affect a large number of people and, as a result, presents a lucrative opportunity for hackers. It's also possible for the poison to propagate to other DNS servers. If an internet service provider (ISP) gets information from a server that has been compromised, this might result in the compromised DNS entry being cached on the ISP's servers, which would then cause it to spread to further routers and devices.

The fact that victims are required to take very little initiative in response to a pharming attack is one of the factors that contributes to the seriousness of this type of online fraud. When a user's DNS server is poisoned, it is possible for them to remain unaffected by malware on their own computer and yet fall victim to the attack. Even taking safeguards such as manually typing the website address or always utilizing trusted bookmarks is not enough because the misdirection happens after the computer submits a connection request. Even taking precautions such as these is not adequate.

Phishers will either use your personal information for fraudulent reasons themselves or sell it to other criminals on the dark web once they have obtained it.

Scams known as phishing and pharming are very similar to one another but are not the same. Phishing is a form of online fraud in which con artists pose as legitimate businesses and send you emails that look like they came from those businesses. The emails contain malicious links that, when clicked, will transport the recipient to a phony website where, unbeknownst to them, the user will be asked to enter personal information such as their username and password. Once they have obtained this information from you, scammers are free to utilize it for their own unlawful ends.

The term "pharming" refers to a sort of "phishing" that does not entail the use of an inducement. Two steps are involved in the pharming process. First, the hackers will install malicious code on your computer or server. The second issue is that running the code will take you to a bogus website, where you might be tricked into giving up sensitive information. Pharming on the internet does not require you to make that first click in order to direct you to a phony website. Instead, you will find that you are immediately sent there, and the pharmers will then have access to whatever personally identifiable information that you disclose while there.

Phishing is when someone sends you a fraudulent email, post on social media, or sends you a text message asking for your financial information. Pharming, on the other hand, does not require a lure. Pharming is also known as "phishing without a lure," which is another name for the practice. Pharming is believed to be more harmful than phishing due to the fact that it can infect multiple computers without the users of those computers taking any action. Pharming assaults, on the other hand, are much more labor intensive for the perpetrators, which is why they are not as common as phishing attacks.

Prior art ways to protect users include: use a trustworthy DNS server, which is often provided by your internet service provider (ISP); however, it is possible to switch to a specialist DNS service that may provide increased protection against DNS poisoning; only click on URLs that start with HTTPS, as opposed to merely HTTP, and look for a locked padlock icon in the address bar, as this is another indication that the site is secure; refrain from clicking on links sent from unknown senders or opening attachments sent by such senders; scanning URLs for typos due to the fact that threat actors will occasionally employ spelling tactics to deceive visitors, such as adding or rearranging letters in domain names; avoiding websites that give off a dubious appearance; avoiding discounts that seem like they are too good to be true; using two-factor authentication whenever it is available; and utilizing the most recent versions of your antivirus and anti-malware software are all effective ways to stay safe online.

However, the foregoing is insufficient to provide sufficient protection because, for example, websites may infringe on company intellectual property such as brands, logos, trademarks and the like, which can fool a user into thinking that the website is legitimate. Additional problems include threat actors monitoring the source of the traffic so that they can either direct to a legitimate website if the traffic is originating from a threat monitoring response team or the like in order to throw off detection of the illegal activity. Stated differently, the threat domain may present one website if the threat actor believes that it is being investigated or monitored, and may present a nefarious website if it believes the traffic is originating from a residential customer or the threat actor's target.

Another problem is that nefarious websites may only be up and live for limited periods of time, which further limits the ability for threat monitoring activity to detect the threat. For example, when threat domains are only live for a limited period of time, threat response teams only have a short time span to capture key details to prove infringement and/or discover threat actor objectives.

Hence there is a long felt and unsatisfied need to provide polymorphic and non-attributable website monitoring in order to provide improved threat detection and threat mitigation.

SUMMARY OF THE INVENTION

In accordance with one or more arrangements of the non-limiting sample disclosures contained herein, solutions are provided to address one or more of the shortcomings in the field of information by, inter alia, (a) utilizing an assortment of infrastructure pieces to monitor websites in a polymorphic non-attributable manner; (b) requesting the source code of websites of interest, calculating their state, and monitoring for changes between requests; (c) capturing screenshots of websites when changes are detected or new sites are identified; (d) using varying characteristics to mask the source of the request against the website being monitored and/or the client fingerprint such as, for example, at least frequently changing settings such as polling frequency, jitter, user agent switching, etc.; (e) using multiple egress endpoints and/or exit nodes configured in an assortment of manners (e.g. VPN endpoint, data center, residential egress node, etc.) to rotate through from where requests are originating and how they likely will be perceived by a threat actor; (f) using polymorphic obfuscation to blend requests into normal web traffic to add a layer of operational security against threat actors monitoring for probing of their infrastructure; (g) capturing different viewpoints to a threat domain by using obfuscation to elicit different responses from websites depending on the nature of the request received and the masked origination of the request; and/or (h) generating notifications and alerts to threat monitoring teams and the like based on site observations and detections to enable threat response workflows. The combination of being non-attributable and polymorphic provides unique tools to counter a threat actor's nefarious actions.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Nor are recited steps necessarily to be performed in any particular order. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a polymorphic non-attributable website monitoring process can be implemented in various steps or modules in certain configurations. For instance, a control server can identify a threat domain to monitor; the control server can determine first obfuscating criteria. The control server can generate a first obfuscated request based on the first obfuscating criteria. The control server can transmit the first obfuscated request to the threat domain. The control server can determine if the threat domain resolved and was accessible. The control server can capture site information from the threat domain. The control server can generate a current fingerprint for the threat domain based on the site information and can compare the current fingerprint to a prior fingerprint to determine if the threat domain has changed.

A screenshot of the threat domain can be obtained by the control server in the event that the threat domain has been modified or in the event that the threat domain was not previously observed. The response to the initial obfuscated request from the threat domain can be captured. The control server can determine whether or not the threat domain is secure. If the threat domain is secure, the control server will capture certificate information from the threat domain and store it in the database.

In some arrangements, a polymorphic non-attributable website monitoring process capture various types of data such as site information, fingerprint(s), response(s) to obfuscated request(s), and security certificate information.

In some arrangements, a polymorphic non-attributable website monitoring process can scan, by the control server, the data (e.g., site information, fingerprint(s), response(s) to obfuscated request(s), etc.) for threat indicia. The scanning can be performed by machine learning (supervised, semi-supervised, unsupervised), by natural language processing of code, by artificial intelligence, and/or by macros or workflows. Some or all the foregoing can be modeled based on historical observations and probabilities of threats for previously observed characteristics.

In some arrangements, threat indicia may indicate that the threat domain is pharming, phishing, attempting to inject malware, infringing intellectual property (e.g., trademark infringement by using brand names or logos, etc.) and/or performing any other illegal or hostile acts.

In some arrangements, various types of data and information may be stored in datastores, databases, or other structures for historical purposes, trend detecting, future comparisons, generating alerts or notifications, etc.

In some arrangements, notifications and/or alerts can be generated regarding the threat domain. Preferably, these notifications and/or alerts can be generated in real-time as soon as changes are detected and/or threats are identified. Threat response workflows or actions can then be taken as soon as possible.

In some arrangements, obfuscated requests may be network-level requests. In other arrangements, obfuscated requests may be application requests. Obfuscation can mask the location or type of person/entity generating the traffic to the threat domain.

In some arrangements, obfuscated requests can be blended into normal traffic such that the threat domain is less likely to detect that it is being monitored or investigated. This will also allow detection of whether the threat domain is presenting different websites depending on whether it believes that it is being investigated or if it believes that the traffic is coming from a residential IP address.

In some arrangements, obfuscated requests can be routed through cloud networks that can randomize or control exit nodes for traffic. In other arrangements, obfuscated requests can be transmitted through an anonymization network.

In some arrangements, a polymorphic non-attributable website monitoring process can include the steps of: determining, by a control server, a threat domain to monitor; determining, by a control server, a website to monitor; and determining, by a control server, a website to monitor; determining, on the part of the control server, whether or not the threat domain resolves and can be accessed. A first network-level obfuscated request is generated by the control server. This request spoofs a first user agent and fakes, as a first residential IP address, an actual IP address for the control server. The control server then sends this request to the threat domain via a cloud network. The first network-level obfuscated request can exit the cloud network through a first exit node and the first network-level obfuscated request can be blended into normal traffic to the threat domain. Alternatively, a Tor network or the like can be used as part of the obfuscation.

The process can further perform the steps of: capturing, by the control server from the threat domain, a screenshot, a first response to the first network-level obfuscated request, and security certificate information; generating, by the control server, a first fingerprint for the threat domain; scanning, by the control server, the screenshot and first response for threat indicia including a fake logo; generating, by the control server, a second network-level obfuscated request that spoofs a first user agent and fakes, as a second residential IP address, the actual IP address for the control server; and transmitting, by the control server after a randomized time interval, the second network-level obfuscated request to the threat domain through the cloud network, said second network-level obfuscated request exiting the cloud network through a second exit node, said first exit node differing from said second exit node, said second network-level obfuscated request blended into said normal traffic to the threat domain.

Additional steps may include: capturing, by the control server from the threat domain, a second response to the second network-level obfuscated request; generating, by the control server, a second fingerprint for the threat domain; scanning, by the control server, the second response for said threat indicia including the fake logo; comparing, by the control server, the first fingerprint to the second fingerprint to determine any change to the threat domain; determining, by the control server, whether a threat exists based on the threat indicia; storing, by the control server in a database, whether the threat domain resolved and was accessible, the first fingerprint, the second fingerprint, the first response, the second response, and the threat indicia; and generating, by the control server based on the threat indicia, a notification regarding whether the threat domain is pharming or phishing.

In some arrangements, normal user traffic is mimicked by using common fingerprinting values and faking origination locations for the traffic to that the threat actor believes that the requests are coming from standard non-suspicious locations.

In some arrangements, computational algorithm(s) detect meaningful changes to a website's source code to decrease the probability of generating false positives.

In some arrangements, one or more various steps of processes disclosed herein can be implemented in whole or in part as computer-executable instructions stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIG. 3 depicts a sample flow diagram for in accordance with one or more information-security aspects of this disclosure as they relate to implementation in the context of a cloud network with varying exit nodes.

DETAILED DESCRIPTION

Figure 1:
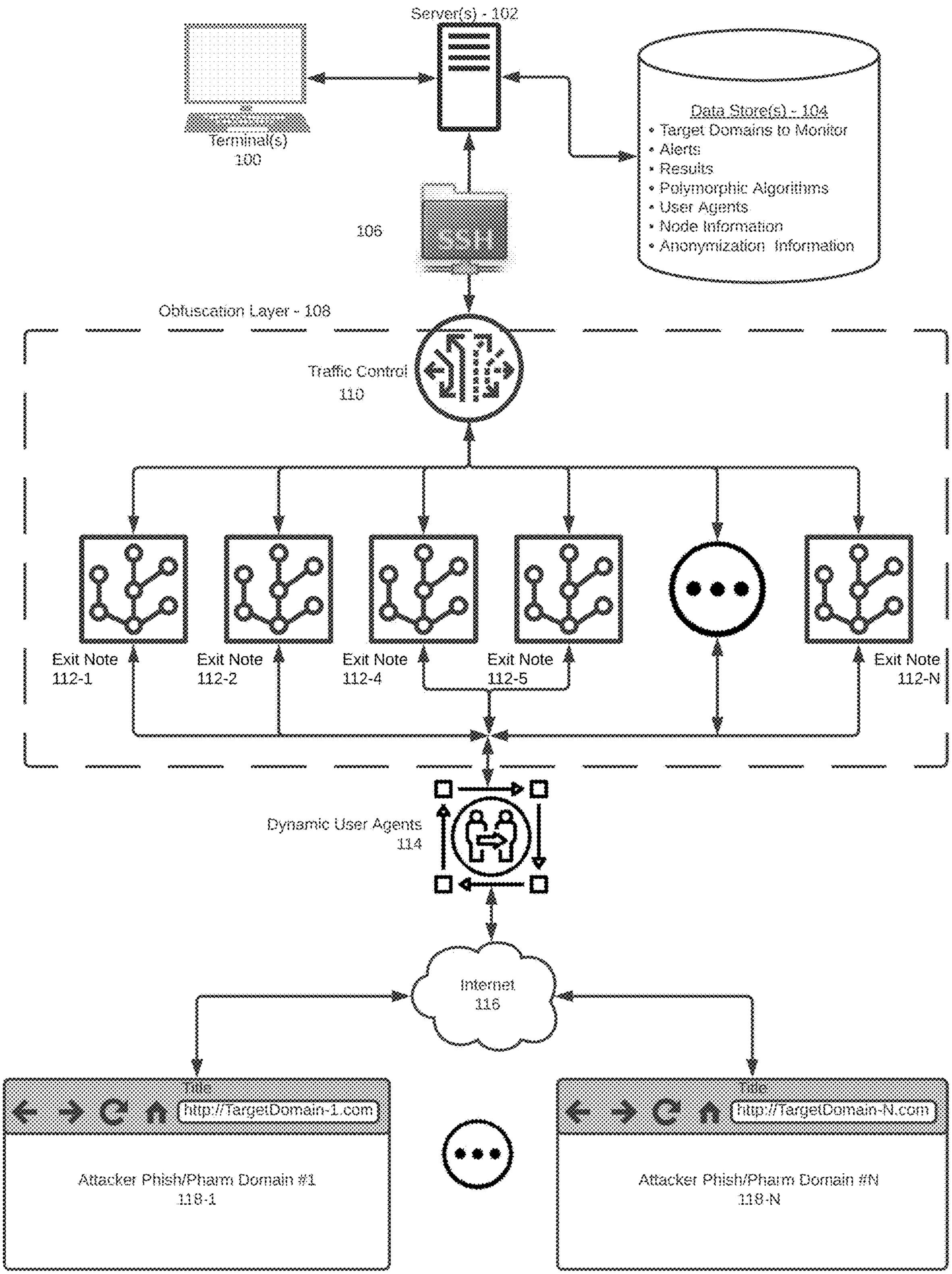
FIG. 1 depicts a sample architectural diagram in accordance with one or more information-security aspects of this disclosure as they relate to implementation in the context of a cloud network with varying exit nodes.

In the following description of the various embodiments to accomplish the foregoing, reference is made to the accompanying drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like can include one or more general-purpose, customized, configured, special-purpose, virtual, physical, and/or network-accessible devices such as: administrative computers, application servers, clients, cloud devices, clusters, compliance watchers, computing devices, computing platforms, controlled computers, controlling computers, desktop computers, distributed systems, enterprise computers, instances, laptop devices, monitors or monitoring systems, nodes, notebook computers, personal computers, portable electronic devices, portals (internal or external), servers, smart devices, streaming servers, tablets, web servers, and/or workstations, which may have one or more application specific integrated circuits (ASICs), microprocessors, cores, executors etc. for executing, accessing, controlling, implementing etc. various software, computer-executable instructions, data, modules, processes, routines, or the like as discussed below.

References to computers, machines, or the like as in the examples above are used interchangeably in this specification and are not considered limiting or exclusive to any type(s) of electrical device(s), or component(s), or the like. Instead, references in this disclosure to computers, machines, or the like are to be interpreted broadly as understood by skilled artisans. Further, as used in this specification, computers, machines, or the like also include all hardware and components typically contained therein such as, for example, ASICs, processors, executors, cores, etc., display(s) and/or input interfaces/devices, network interfaces, communication buses, or the like, and memories or the like, which can include various sectors, locations, structures, or other electrical elements or components, software, computer-executable instructions, data, modules, processes, routines etc. Other specific or general components, machines, or the like are not depicted in the interest of brevity and would be understood readily by a person of skill in the art.

As used throughout this disclosure, software, computer-executable instructions, data, modules, processes, routines, or the like can include one or more: active-learning, algorithms, alarms, alerts, applications, application program interfaces (APIs), artificial intelligence, approvals, asymmetric encryption (including public/private keys), attachments, big data, CRON functionality, daemons, databases, datasets, datastores, drivers, data structures, emails, extraction functionality, file systems or distributed file systems, firmware, governance rules, graphical user interfaces (GUI or UI), images, instructions, interactions, Java jar files, Java Virtual Machines (JVMs), juggler schedulers and supervisors, load balancers, load functionality, machine learning (supervised, semi-supervised, unsupervised, or natural language processing), middleware, modules, namespaces, objects, operating systems, platforms, processes, protocols, programs, rejections, routes, routines, security, scripts, tables, tools, transactions, transformation functionality, user actions, user interface codes, utilities, web application firewalls (WAFs), web servers, web sites, etc.

The foregoing software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data etc.

As used throughout this disclosure, computer "networks," topologies, or the like can include one or more local area networks (LANs), wide area networks (WANs), the Internet, cloud networks, anonymization networks, wired networks, wireless networks, digital subscriber line (DSL) networks, frame relay networks, asynchronous transfer mode (ATM) networks, virtual private networks (VPN), or any direct or indirect combinations of the same. They may also have separate interfaces for internal network communications, external network communications, and management communications. Virtual IP addresses (VIPs) may be coupled to each if desired. Networks also include associated equipment and components such as access points, adapters, buses, ethernet adaptors (physical and wireless), firewalls, hubs, modems, routers, and/or switches located inside the network, on its periphery, and/or elsewhere, and software, computer-executable instructions, data, modules, processes, routines, or the like executing on the foregoing. Network(s) may utilize any transport that supports HTTPS or any other type of suitable communication, transmission, and/or other packet-based protocol.

By way of non-limiting disclosure, FIG. 1 depicts a sample architectural diagram in accordance with one or more information-security aspects of this disclosure as they relate to implementation in the context of a cloud network with varying exit nodes.

One or more terminal(s) 100 are coupled to servers 102, such as control servers, which have local or network access to datastore(s) 104, databases, data structures, etc. Datastore(s) 104 may serve as a repository for, inter alia, a list of target domains to monitor, alerts, results and notifications, polymorphic algorithms, user agents, node information, anonymization information, etc. Obfuscation criteria and data may be stored as well.

Process(es) running on the control server(s) 102 may access an obfuscation layer 108 or infrastructure by initiating a secure shell login (SSH) 106 in order to access a cloud network. Traffic generated by the server 102 can be controlled and routed through the cloud network (e.g., Amazon E2C server with its control server, IPSec tunnel to load balancer(s)) 110 and exit through randomized exit nodes 112-1, 112-2, 112-3, 112-4, 112-5 . . . 112-N. This helps mask and obfuscate the origin of the requests to make it more difficult for the target domains to detect and attempt to counter monitoring activity. Traffic exiting the cloud network can utilize dynamic user agents 114 by spoofing them to further increase the difficulty of detection.

Obfuscated requests are blended in with normal traffic that traverses the Internet to reach the target domains 118-1 . . . 118-N that are being monitored for potential phishing, pharming, infringement, etc.

Figure 2:
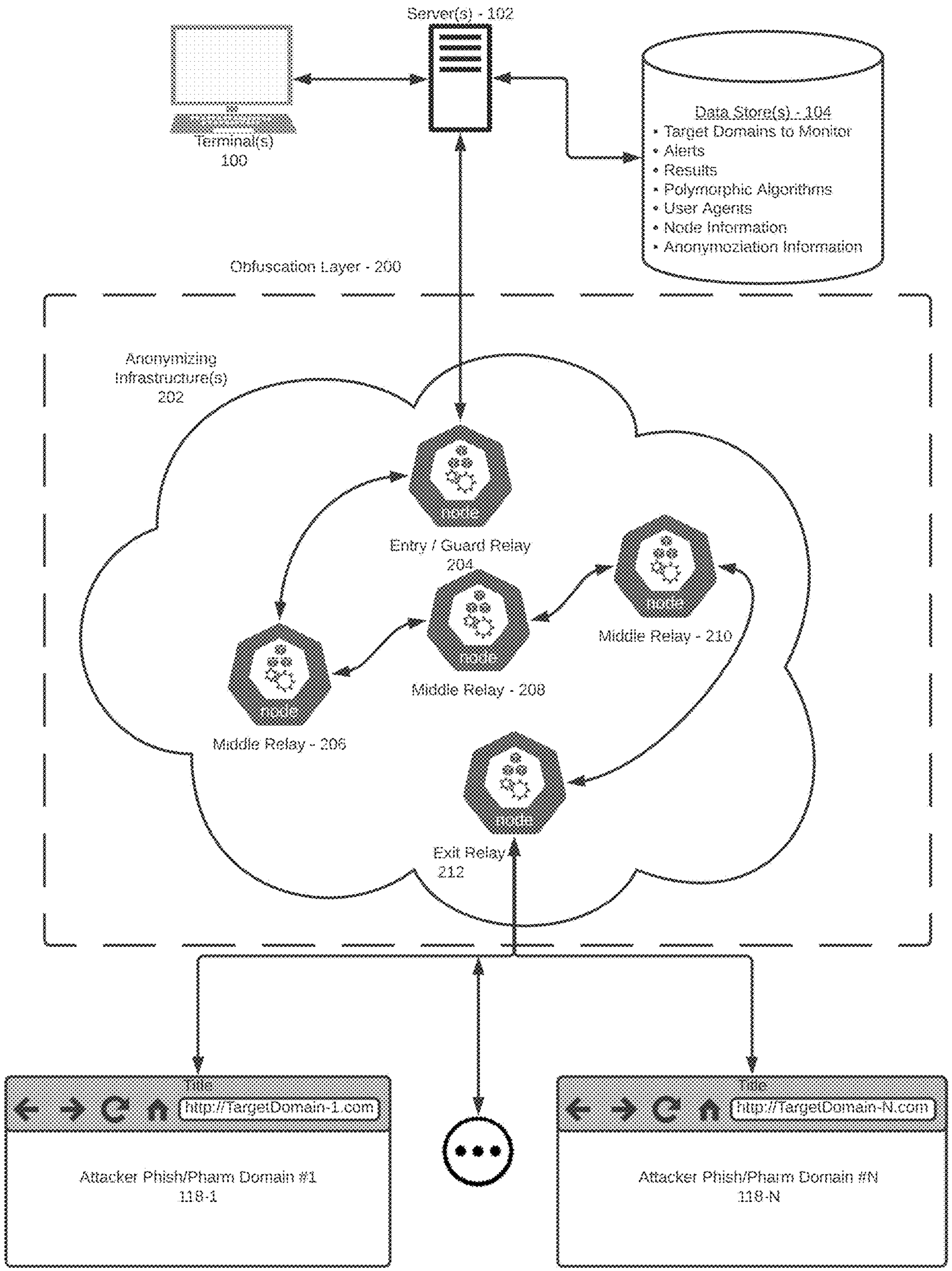
FIG. 2 depicts a sample architectural diagram in accordance with one or more information-security aspects of this disclosure as they relate to implementation in the context of an anonymization network.

By way of non-limiting disclosure, FIG. 2 depicts a sample architectural diagram in accordance with one or more information-security aspects of this disclosure as they relate to implementation in the context of an anonymization network. Terminal(s) 100, control server(s), and datastore(s) 104 can operate in the same way as in FIG. 1. Of course, the threat targets 118-1 . . . 118-N remain the same as well.

FIG. 2 differs from FIG. 1 in that an anonymizing infrastructure 202 is utilized as part of an obfuscation layer 200 to obfuscate requests issued to the target domain. Traffic entering the anonymization network can be received by an entry/guard relay 204 and be passed through a series of middle relays 206, 208, 210, and then exit through an exit relay 212. An example implementation of this type could be a Tor network.

By way of non-limiting disclosure, FIG. 3 depicts a sample flow diagram for in accordance with one or more information-security aspects of this disclosure as they relate to implementation in the context of a cloud network with varying exit nodes.

A threat domain to monitor can be identified in 300. This could be initiated from terminal(s) 100 by adding a domain to a target list, selecting a domain manually or automatically from a list, automatic adding of a domain to the list by virtue of detection of registration of the domain, etc. For any given monitoring workflow, a delay for monitoring requests 302 (randomized or determined algorithmically) may be implemented to help increase the difficulty of detection by introducing unpredictability into the process. For an initial monitor, there is no need for a delay and the process may be commenced immediately or on a particular schedule. However, subsequent monitoring activity is preferably at varying intervals to make it difficult for the threat actor to detect.

A determination can be made with respect to a polymorphic non-attributable profile for obfuscation to present to threat domain in 304. This may include dynamic selection of characteristics for the proposed obfuscation request. A selection or determination can be made as to whether the request should be made at a network request level or at an application level. Obfuscation may be utilized to blend requests into normal traffic to domain (e.g., by spoofing user agent, etc. so that request will appear as though it originated from a residential IP address in a particular geographical location and therefore will be less suspicious to the threat actor).

In 306, a connection may be made to a managed cloud network (e.g., Amazon E2C server) via secure shell protocol (SSH) to use as a proxy. A dynamic selection of an exit node may be made to mask origination information for the obfuscated request in 308 and the target domain may be contacted thereafter in 310.

A determination may be first made as to whether the domain resolves in 312. For example, if the domain is registered and a monitoring request is issued to the domain before it is live, the domain will not resolve. The result of that determination may be stored in 326 and the process may be repeated at a later time to detect when the site goes live.

If the domain resolves 312, a determination may next be made as to whether it is accessible in 314. If not, the results may be stored 326 and a subsequent monitoring attempt may be commenced at a later date and/or time. If the domain is accessible 314, then the site can be captured and different responses from threat domain based on the profile in use can be used to determine variations (e.g., whether the same website is presented from everywhere irrespective of the location of the request or whether the request is originating from a residential IP address, or whether different websites are presented for different request originations), and a fingerprint for the website can be generated in 316.

If this is the first time the target is observed or if fingerprint changed, screenshot(s) of the website can be captured in 318.

If the website represents itself as being secure (e.g., by HTTPS:// . . . ) in 320, security certificate information can be captured in 322.

Thereafter, responses from the threat domain can be scanned in 324 for threat indicia (e.g., logos, brand infringement, or other identifiers of pharming, phishing, etc.). And the results may be stored in 326.

If a threat is detected in 328, a threat response workflow or process may be commenced in 330. Notifications and/or alerts can be generated and sent automatically as desired in 332.

Figure 4:
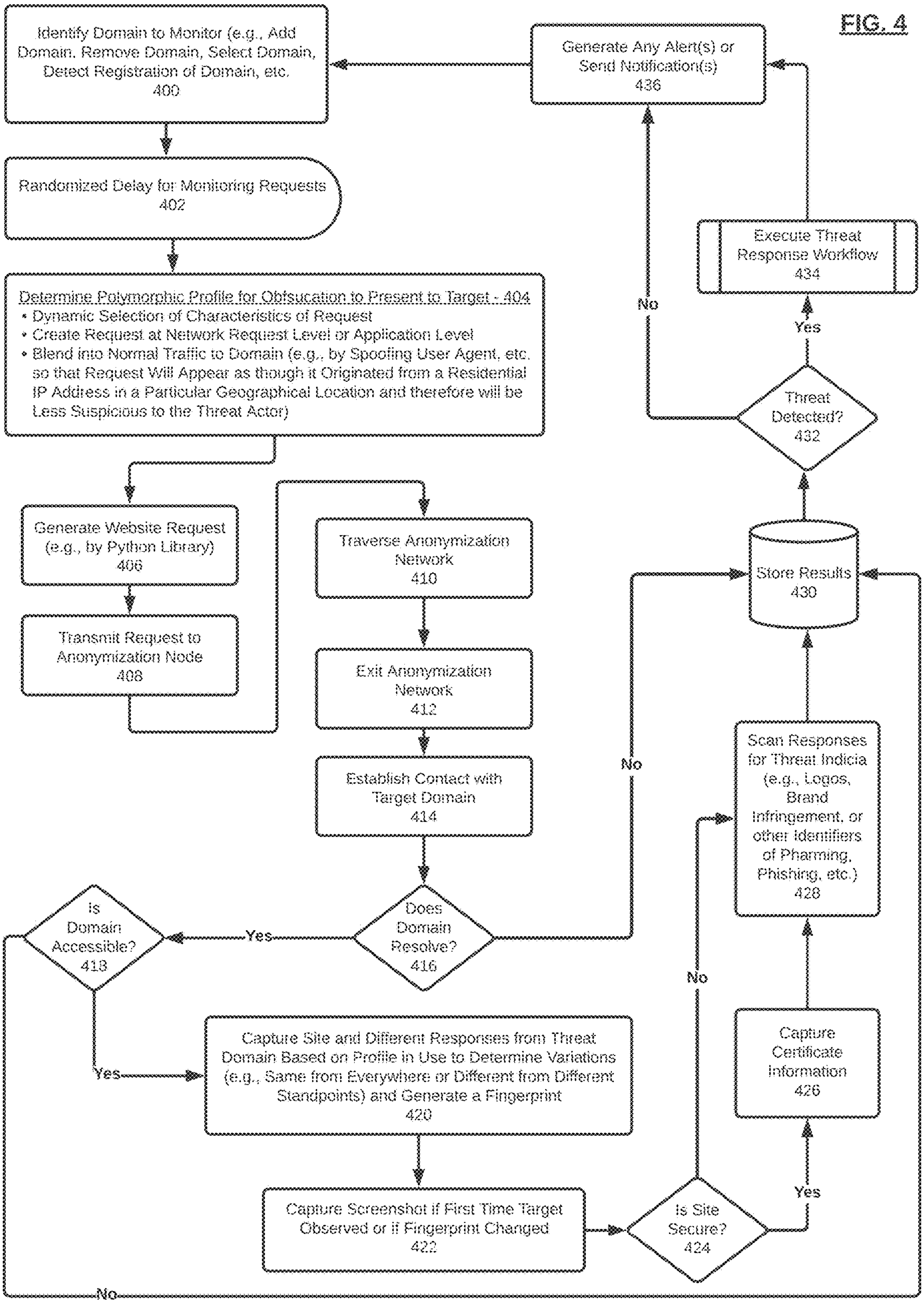
FIG. 4 depicts a sample architectural diagram in accordance with one or more information-security aspects of this disclosure as they relate to implementation in the context of an anonymization network.

By way of non-limiting disclosure, FIG. 4 depicts a sample architectural diagram in accordance with one or more information-security aspects of this disclosure as they relate to implementation in the context of an anonymization network.

The example of FIG. 4 is similar to FIG. 3 but differs in that an anonymization network is utilized as part of the obfuscation layer.

Like with FIG. 3, a threat domain to monitor can be identified in 400. This could be initiated from terminal(s) 100 by adding a domain to a target list, selecting a domain manually or automatically from a list, automatic adding of a domain to the list by virtue of detection of registration of the domain, etc. For any given monitoring workflow, a delay for monitoring requests 402 (randomized or determined algorithmically) may be implemented to help increase the difficulty of detection by introducing unpredictability into the process. For an initial monitor, there is no need for a delay and the process may be commenced immediately or on a particular schedule. However, subsequent monitoring activity is preferably at varying intervals to make it difficult for the threat actor to detect.

Again, a determination can be made with respect to a polymorphic non-attributable profile for obfuscation to present to threat domain in 404. This may include dynamic selection of characteristics for the proposed obfuscation request. A selection or determination can be made as to whether the request should be made at a network request level or at an application level. Obfuscation may be utilized to blend requests into normal traffic to domain (e.g., by spoofing user agent, etc. so that request will appear as though it originated from a residential IP address in a particular geographical location and therefore will be less suspicious to the threat actor).

A website request may be generated (e.g., by Python library) in 406. The request can be transmitted to an anonymization node in 408. The anonymization network can be traversed in 410 and exited in 412. Contact with the threat domain can be established in 414.

A determination may be first made as to whether the domain resolves in 416. For example, if the domain is registered and a monitoring request is issued to the domain before it is live, the domain will not resolve. The result of that determination may be stored in 430 and the process may be repeated at a later time to detect when the site goes live.

If the domain resolves 416, a determination may next be made as to whether it is accessible in 418. If not, the results may be stored 430 and a subsequent monitoring attempt may be commenced at a later date and/or time. If the domain is accessible 418, then the site can be captured and different responses from threat domain based on the profile in use can be used to determine variations (e.g., whether the same website is presented from everywhere irrespective of the location of the request or whether the request is originating from a residential IP address, or whether different websites are presented for different request originations), and a fingerprint for the website can be generated in 420.

If this is the first time the target is observed or if fingerprint changed, screenshot(s) of the website can be captured in 422.

If the website represents itself as being secure (e.g., by HTTPS:// . . . ) in 424, security certificate information can be captured in 426.

Thereafter, responses from the threat domain can be scanned in 428 for threat indicia (e.g., logos, brand infringement, or other identifiers of pharming, phishing, etc.). And the results may be stored in 430.

If a threat is detected in 432, a threat response workflow or process may be commenced in 434. Notifications and/or alerts can be generated and sent automatically as desired in 436.

The foregoing presents various arrangements and options for implementing a polymorphic non-attributable website monitor and monitoring process. This enables the surreptitious monitoring of threat domains and real-time capturing and mitigation of threats.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for polymorphic non-attributable website monitoring, comprising:

determining, by a control server, whether a threat domain resolves;

determining, by a control server, whether the threat domain is accessible;

storing, by a control server, in a database, information indicating whether the threat domain resolved and whether the threat domain was accessible;

upon determining that the threat domain resolved and was accessible:

capturing, by a control server, site information from the threat domain;

generating, by a control server, a current fingerprint for the threat domain based on the captured site information;

comparing, by a control server, the current fingerprint with a prior fingerprint for the threat domain to identify changes;

capturing, by a control server, a screenshot of the threat domain if changes are identified or if the threat domain has not been previously observed;

capturing, by a control server, a response from the threat domain to a first obfuscated request;

determining, by a control server, whether the threat domain is secure;

capturing, by a control server, certificate information from the threat domain if the domain is determined to be secure; and storing, by a control server, in the database, data observed from the threat domain, including the captured site information, current fingerprint, response to the obfuscated request, and certificate information.

2. The method of claim 1, wherein the information collected from the domain includes any available data presented by the domain.

3. The method of claim 1, wherein the step of analyzing comprises identifying characteristics indicative of potentially unauthorized activities.

4. The method of claim 1, further comprising storing collected information in a repository for future analysis.

5. The method of claim 1, wherein a report includes findings related to the indicators of interest identified during analysis.

6. A method for monitoring web domains comprising the steps of:

determining, by a control server, whether a domain of interest resolves;

determining, by a control server, whether the domain of interest is accessible;

storing, by a control server, in a database, information indicating whether the domain resolved and whether it was accessible;

upon determining that the domain resolved and was accessible:

capturing, by a control server, site information from the domain;

generating, by a control server, a current fingerprint for the domain based on the captured site information;

comparing, by a control server, the current fingerprint with a prior fingerprint for the domain to identify changes;

capturing, by a control server, a screenshot of the domain if changes are identified or if the domain has not been previously observed;

determining, by a control server, whether the domain is secure;

capturing, by a control server, certificate information from the domain if the domain is determined to be secure; and generating alerts based on collected data, including indicators of interest and any observed anomalies.

7. The method of claim 6, wherein the collected data includes visual representations of the domain.

8. The method of claim 6, wherein the collected data includes security information associated with the domain.

9. The method of claim 6, further comprising comparing the collected data with previously stored data to identify changes.

10. The method of claim 6, wherein the alerts include notifications regarding potential risks or anomalies.

11. The method of claim 10, further comprising:

identifying a domain;

assessing the domain for availability;

retrieving information from the domain if available; and storing and analyzing the retrieved information.

12. The method of claim 11, wherein analysis includes identifying indicators of potential unauthorized activities.

13. The method of claim 11, further comprising generating a notification based on analysis results.

14. The method of claim 11, wherein the stored information is used to establish historical records for the domain.

15. The method of claim 11, wherein analysis is performed using one or more automated tools.

16. A system for polymorphic non-attributable website monitoring, comprising:

a control server configured to determine whether a threat domain resolves and whether the threat domain is accessible;

a database configured to store information indicating whether the threat domain resolved and whether it was accessible;

a site information capture module configured to collect site information from the threat domain upon determining that the domain resolved and was accessible;

a fingerprint generation module configured to generate a current fingerprint for the threat domain based on the captured site information;

a comparison module configured to compare the current fingerprint with a prior fingerprint for the threat domain to identify changes;

a screenshot capture module configured to capture a screenshot of the threat domain if changes are identified or if the threat domain has not been previously observed;

a response capture module configured to collect a response from the threat domain to a request;

a security determination module configured to determine whether the threat domain is secure; and a certificate capture module configured to collect certificate information from the threat domain if the domain is determined to be secure, wherein the system is further configured to store data observed from the threat domain, including the captured site information, current fingerprint, response, and certificate information.

17. The system of claim 16, wherein the site information capture module is further configured to collect additional metadata associated with the threat domain.

18. The system of claim 17, wherein the fingerprint generation module uses machine learning to refine fingerprint accuracy over time.

19. The system of claim 18, wherein the comparison module evaluates changes in the threat domain by incorporating historical data trends.

20. The system of claim 19, wherein the database is further configured to support real-time queries for stored threat domain data to enhance threat detection workflows.

* * * * *